US006388015B1

(12) United States Patent
Aimura et al.

(10) Patent No.: US 6,388,015 B1
(45) Date of Patent: May 14, 2002

(54) RUBBER COMPOSITION, ELECTRIC WIRE COATING MATERIAL, AND ELECTRIC WIRE

(75) Inventors: Yoshiaki Aimura; Manabu Asai, both of Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/486,377

(22) PCT Filed: Aug. 31, 1998

(86) PCT No.: PCT/JP98/03879

§ 371 Date: Feb. 28, 2000

§ 102(e) Date: Feb. 28, 2000

(87) PCT Pub. No.: WO99/11704

PCT Pub. Date: Mar. 11, 1999

(30) Foreign Application Priority Data

Aug. 29, 1997 (JP) ............................................... 9-249598

(51) Int. Cl.⁷ ............................ C08L 9/02; C08L 23/08; C08L 33/08
(52) U.S. Cl. ..................... 525/194; 525/193; 525/223; 525/230
(58) Field of Search ................................. 525/193, 194, 525/223, 230

(56) References Cited

U.S. PATENT DOCUMENTS 5,362,533 A  *  11/1994  Fukuda

FOREIGN PATENT DOCUMENTS

WO        9728216     *  8/1997

* cited by examiner

*Primary Examiner*—David J. Buttner
(74) *Attorney, Agent, or Firm*—Armstrong, Westerman & Hattori, LLP

(57) ABSTRACT

A rubber composition comprising (A) a rubber ingredient comprised of (a) a nitrile group-containing highly saturated copolymer rubber having an iodine value of not larger than 120, preferably a hydrogenated product of an unsaturated nitrile-conjugated diene copolymer rubber, and (b) an acrylic ester polymer rubber, preferably a copolymer rubber comprising at least 80 mol % of alkyl acrylate or alkoxyalkyl acrylate units, at an (a)/(b) ratio of 40/60 to 90/10 by weight, and (B) an ethylene-α-olefin copolymer, the (A)/(B) ratio being in the range of 30/70 to 70/30 by weight. This rubber composition is useful as a covering material for forming a protective covering layer on electric wires.

20 Claims, No Drawings

RUBBER COMPOSITION, ELECTRIC WIRE COATING MATERIAL, AND ELECTRIC WIRE

TECHNICAL FIELD

This invention relates to a rubber composition exhibiting, when crosslinked, good heat resistance and cold resistance, and having an especially improved extrusion-processability. It further relates to an electric wire having a protective covering or coating layer formed by crosslinking the rubber composition in the state of surrounding the electric wire.

BACKGROUND ART

Electric wire coating materials are exposed to a severe temperature environment for a long term due to heat generated by application of electricity. Therefore they are subject to crack-formation due to heat deterioration and sometimes insulation failure or dielectric breakdown is caused. Further, electric wire covering materials are subject to external heating depending upon the particular surrounding environment.

The electric wire covering materials are comprised of rubber. The rubber used includes natural rubber, a styrene-butadiene rubber and other synthetic rubbers. When a high heat resistance is required for an electric wire protecting covering, covering materials made of rubbers such as a fluororubber, an ethylene-propylene-diene copolymer rubber and a silicone rubber are used. However, these rubbers have problems in that a fluororubber is expensive, an ethylene-propylene-diene copolymer rubber has a relatively low heat resistance, and a silicone rubber has a poor mechanical strength.

It is known that a blend of a nitrile group-containing highly saturated copolymer rubber with an acrylic rubber has a good heat resistance. As a specific example of the rubber blend, a rubber composition comprising a blend of a hydrogenated, unsaturated nitrile-conjugated diene copolymer rubber, which is a nitrile group-containing highly saturated copolymer rubber, with an acrylic rubber, having incorporated therein an organic peroxide and a bismaleimide compound, is described in Japanese Unexamined Patent Publication (hereinafter abbreviated to "JP-A") No. H2-3438. This rubber composition is referred to as having good heat resistance, abrasion resistance, flexural resistance and oil resistance. The acrylic rubber contained in this rubber composition contains crosslinkable monomer units having a carbon-carbon unsaturated bond as a crosslinkable ingredient, and therefore, when a crosslinked product of this rubber composition is exposed to a high temperature environment having a temperature of, for example, about 150° C. for long hours, it is hardened and deteriorated. Therefore, this rubber composition is not suitable for an electric wire protective coating for which good heat resistance is required.

In conventional electric wire protective covering materials containing a rubber ingredient, a resinous ingredient such as polyethylene or an ethylene-vinyl acetate copolymer is often incorporated to impart a good extrusion processability thereto. For example, when polyethylene is incorporated in an electric wire protective covering material a protective covering made by crosslinking the protective covering material has good cold resistance, but poor heat resistance. Furthermore, when an ethylene-vinyl acetate copolymer is blended, for example, with an elastomer having a nitrile group, 25 to 140 nitrile nitrogen atoms per 1000 carbon atoms, and not more than 35 unsaturated bonds, as taught in JP-A S60-112839, a cable sheath having good heat resistance is obtained by radically crosslinking the blend of an ethylene-vinyl acetate copolymer with an elastomer. However, an electric wire protective covering made from the ethylene-vinyl acetate copolymer with an elastomer exhibits poor cold resistance although the protective covering has good heat resistance.

DISCLOSURE OF THE INVENTION

An object of the present invention is to provide a rubber composition which can give an electric wire protective covering having good and balanced heat resistance and cold resistance and, even when it is exposed to a high temperature environment, the protective coating being not hardened nor deteriorated, and thus, keeping good rubber characteristics, and which rubber composition possesses good extrusion processability.

Another object of the present invention is to provide an electric wire protective covering material comprising the above-mentioned rubber composition.

A further object of the present invention is to provide an electric wire having a protective covering layer having good properties, which is made by crosslinking the above-mentioned electric wire covering material.

In one aspect of the present invention, there is provided a rubber composition comprising (A) a rubber ingredient comprised of (a) a nitrile group-containing highly saturated copolymer rubber having an iodine value of not larger than 120 and (b) an acrylic ester polymer rubber containing at least 80% by mole of at least one kind of monomer units selected from alkyl acrylates and alkoxyalkyl acrylate, and which is free from a carbon-carbon unsaturated bond except for the carbon-carbon double bonds of a benzene ring, at an (a)/(b) ratio of 40/60 to 90/10 by weight, and (B) an ethylene-α-olefin copolymer, the (A)/(B) ratio being in the range of 30/70 to 70/30 by weight; said rubber composition further comprising an organic peroxide and being free from an auxiliary capable of covulcanizing the rubber ingredient (a) and the rubber ingredient (b) with the organic peroxide.

In another aspect of the present invention, there is provided an electric wire covering material comprising the above-mentioned rubber composition.

In still another aspect of the present invention, there is provided an electric wire having a protective covering layer which is formed by extruding the above-mentioned electric wire covering material around an electric wire and crosslinking the extruded covering

BEST MODE FOR CARRYING OUT THE INVENTION

Nitrile Group-Containing Highly Saturated Copolymer Rubber

The nitrile group-containing highly saturated copolymer rubber, i.e., ingredient (a) in the rubber ingredient (A) used in the invention, has an iodine value of not larger than 120. The iodine value is preferably not larger than 80, and more preferably not larger than 15. If the iodine value is too large, a crosslinked product of the rubber composition has poor heat resistance.

The Mooney viscosity of the nitrile group-containing highly saturated copolymer rubber is not particularly limited, but, in view of mechanical strength of a crosslinked product of the rubber composition and extrusion processability of the rubber composition, the Mooney viscosity is usually at least 15 and not larger than 200, and preferably at least 30 and not larger than 100.

The nitrile group-containing highly saturated copolymer rubber can be prepared by (i) a first process of copolymerizing an unsaturated nitrile monomer, an α-olefin monomer and an optional copolymerizable monomer, or (ii) a second process of copolymerizing an unsaturated nitrile monomer, a conjugated diene monomer and an optional copolymerizable monomer, and then, hydrogenating the thus-obtained copolymer or terpolymer rubber whereby at least part of the unsaturated bonds in the conjugated diene monomer units of the copolymer or terpolymer rubber is saturated. The α-olefin monomer used in the first process preferably has 2 to 12 carbon atoms and includes, for example, ethylene, propylene, butene-1,4-methylpentene-1, hexene-1 and octene-1. Of the above-mentioned two processes, the second process is preferable.

As specific examples of the unsaturated nitrile monomer, there can be mentioned acrylonitrile, methacrylonitrile and α-chloroacrylonitrile. These unsaturated nitrile monomers may be used either alone or in combination. Of these, acrylonitrile is preferable.

The content of nitrile group-containing monomer units in the nitrile group-containing highly saturated copolymer rubber is preferably at least 10% by weight and not larger than 50% by weight, and more preferably at least 15% by weight and not larger than 40% by weight.

As specific examples of the conjugated diene monomer to be copolymerized with the unsaturated nitrile monomer, there can be mentioned 1,3-butadiene, 2,3-dimethylbutadiene, isoprene and 1,3-pentadiene. These conjugated diene monomers may be used either alone or in combination. Of these, 1,3-butadiene is preferable.

As specific examples of the monomer optionally copolymerized with the unsaturated nitrile monomer and the conjugated diene monomer, there can be mentioned unsaturated carboxylic acid esters represented by acrylates and methacrylates, which include acrylates and methacrylates having an alkyl group with 1 to about 18 carbon atoms, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; acrylates and methacrylates having an alkoxyalkyl group with 2 to about 12 carbon atoms, such as methoxymethyl acrylate, methoxymethyl methacrylate, methoxyethyl acrylate, ethoxyethyl acrylate, butoxyethyl acrylate, ethoxypropyl acrylate and ethoxybutyl acrylate; acrylates and methacrylates having a cyanoalkyl group with 2 to about 12 carbon atoms, such as α-cyanoethyl acrylate, β-cyanoethyl acrylate, α-cyanopropyl acrylate, β-cyanopropyl acrylate, γ-cyanopropyl acrylate, cyanobutyl acrylate, cyanobutyl methacrylate, cyanohexyl acrylate and cyanooctyl acrylate; monoalkyl unsaturated dicarboxylate and dialkyl unsaturated dicarboxylates such as monoethyl maleate, dimethyl maleate, dimethyl fumarate, diethyl fumarate, di-n-butyl fumarate, di-2-ethylhexyl fumarate, dimethyl itaconate, diethyl itaconate, di-n-butyl itaconate and di-2-ethylhexyl itaconate; amino group-containing unsaturated carboxylates such as dimethylaminomethyl acrylate, diethylaminoethyl acrylate, 3-(diethylamino)-2-hydroxypropyl acrylate and 2,3-bis(difluoroamino)propyl acrylate; acrylates and methacrylates having a fluoroalkyl group, such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluorooctyl methacrylate and hexadecafluorononyl methacrylate; fluoro-substituted benzyl acrylates and fluoro-substituted benzyl methacrylates, such as fluorobenzyl acrylate, fluorobenzyl methacrylate and difluorobenzyl methacrylate.

The optional copolymerizable monomer further includes, for example, aromatic vinyl monomers such as styrene, α-methylstyrene and vinylpyridine; non-conjugated diene monomers such as vinylnorbornene, dicyclopentadiene and 1,4-hexadiene; fluorine-containing vinyl monomers such as fluoroalkyl vinyl ethers, for example, fluoroethyl vinyl ether, fluoropropyl vinyl ether, trifluoromethyl vinyl ether, trifluoroethyl vinyl ether, perfluoropropyl vinyl ether and perfluorohexyl vinyl ether, and o-trifluoromethylstyrene, p-trifluoromethylstyrene, vinyl pentafluorobenzoate, difluoroethylene and tetrafluoro-ethylene; unsaturated monocarboxylic acids such as acrylic acid and methacrylic acid; unsaturated dicarboxylic acids such as itaconic acid, fumaric acid and maleic acid, and anhydrides thereof; copolymerizable antioxidants such as N-(4-anilinophenyl)-acrylamide, N-(4-anilinophenyl)methacrylamide, N-(4-anilinophenyl)cinnamamide, N-(4-anilinophenyl)-crotonamide, N-(4-anilinophenyl)amino-2-hydroxypropyl allyl ether, N-(4-anilinophenyl)amino-2-hydroxypropyl methacryl ether, 5-N-(4-anilinophenyl)amino-2-hydroxypentyl acrylate, 5-N-(4-anilinophenyl)amino-2-hydroxypentyl methacrylate, 2-N-(4-anilinophenyl)aminoethyl acrylate, 2-N-(4-anilinophenyl)aminoethyl methacrylate, N-[4-(methylanilino)-phenyl]acrylamide, N-[4-(methylanilino)phenyl]mathacrylamide, N-(4-anilinophenyl)maleimide, N-[4-(methylanilino)phenyl]-maleimide, N-phenyl-4-(3-vinylbenzyloxy)aniline and N-phenyl-4-(4-vinylbenzyloxy) aniline; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate. Of these, unsaturated carboxylic acid esters are preferable. Dialkyl esters of unsaturated dicarboxylic acids are especially preferable.

The monomer optionally copolymerized with the unsaturated nitrile monomer and the conjugated diene monomer may be used either alone or in combination. The amount of the optionally copolymerized monomer is usually not larger than 50% by weight, preferably not larger than 40% by weight, based on the total weight of the monomers.

The procedure by which the nitrile group-containing copolymer rubber is hydrogenated is not particularly limited, and a conventional hydrogenation procedure can be adopted. As examples of the catalyst used for hydrogenation, there can be mentioned palladium/silica, palladium complexes described in, for example, JP-A H3-252405, and rhodium compounds and ruthenium compounds, described in, for example, JP-A S62-125858, JP-A S62-42937, JP-A H1-45402, JP-A H1-45403, JP-A H1-45404 and JP-A H1-45405.

As examples of commercially available nitrile group-containing highly saturated copolymer rubbers, there can be mentioned ZETPOL 2000, ZETPOL 2020, ZETPOL 1010, ZETPOL 1020, ZETPOL 2010, ZETPOL 2000L, ZETPOL 2010L and ZETPOL 2020L, all of which are supplied by Nippon Zeon Co.

Acrylic Ester Polymer Rubber

The acrylic ester polymer rubber, i.e., ingredient (b) in the rubber ingredient (A) used in the invention, is a copolymer rubber containing at least 80% by mole of alkyl acrylate units and/or alkoxyalkyl acrylate units, and is substantially free from a carbon-carbon unsaturated bond. As preferable examples of the alkyl acrylate, there can be mentioned those which have an alkyl group with not more than 8 carbon atoms, such as methyl acrylate, ethyl acrylate and propyl acrylate. As preferable examples of the alkoxyalkyl acrylate, there can be mentioned those which have an alkoxyalkyl group with not more than 8 carbon atoms, such as methoxymethyl acrylate, methoxyethyl acrylate and ethoxymethyl acrylate. In view of excellent heat resistance of the crosslinked rubber composition, a polyacrylate rubber containing at least 80% by mole of ethyl acrylate is more preferable, a polyacrylate rubber containing at least 90% by mole of ethyl acrylate is especially preferable, and a polyacrylate rubber containing at least 95% by mole of ethyl acrylate is most preferable.

To produce a crosslinked rubber product having an enhanced heat resistance and exhibiting, when stored for a long term, an extremely reduced deterioration due to curing, a monomer copolymerized with the alkyl acrylate and/or the alkoxyalkyl acrylate is free from a carbon-carbon double bond except for a carbon-carbon double bond providing a polymerizable site and except for the carbon-carbon double bonds of a benzene ring. The amount of the monomer to be copolymerized with the alkyl acrylate and/or the alkoxyalkyl acrylate is preferably not larger than 20% by mole, more preferably not larger than 10% by mole and most preferably not larger than 5% by mole, based on the weight of the acrylic ester polymer rubber.

As specific examples of the monomer copolymerized, there can be mentioned aromatic vinyl monomers such as styrene, α-methylstyrene and vinylpyridine; fluoroalkyl vinyl ether monomers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o-trifluoromethyl-styrene, p-trifluoromethylstyrene, vinyl pentafluorobenzoate, difluoroethylene and tetrafluoroethylene; and crosslinking monomers which include, for example, unsaturated monocarboxylic acids such as acrylic acid and methacrylic acid; unsaturated dicarboxylic acids such as itaconic acid, fumaric acid and maleic acid, and anhydrides thereof; polyethylene glycol acrylate, polyethylene glycol methacrylate, polypropylene glycol acrylate, polypropylene glycol methacrylate, epoxy acrylate, epoxy methacrylate, urethane acrylate and urethane methacrylate; active chlorine-containing unsaturated monomers such as vinyl chloroacetate, allyl chloroacetate, vinylbenzyl chloride, 2-chloroethyl vinyl ether, chloromethyl vinyl ketone and 5-chloromethyl-2-norbornene; and epoxy group-containing unsaturated monomers such as glycidyl acrylate, glycidyl methacrylate, allyl glycidyl ether and vinyl glycidyl ether. These monomers may be used either alone or in combination.

Among the crosslinking monomers, active chlorine-containing unsaturated monomers are preferable. Unsaturated compounds having a carbon-carbon double bond except for carbon-carbon double bonds of a benzene ring, in addition to a carbon-carbon double bond providing a polymerizable site, which are conventionally used as a crosslinking agent for an acrylic rubber, are not preferable in the present invention. Such unfavorable monomers include, for example, butadiene, 2-butenyl acrylate, ethylene glycol dimethacrylate, triallyl isocyanurate and divinylbenzene. If these crosslinking monomers are used, a crosslinked product made from the rubber composition becomes easily subject to hardening and deterioration when it is exposed to a high temperature in air. Therefore, these unsaturated compounds are not used in the present invention.

In view of the rate of crosslinking and the rubber elasticity of a crosslinked rubber product, the amount of the above-mentioned crosslinking monomers used is preferably in the range of 0.1 to 10% by mole, based on the total amount of the monomers for the acrylic ester polymer rubber.

The acrylic ester polymer rubber usually has a Mooney viscosity of at least 10 and not larger than 90, preferably at least 20 and not larger than 70, and more preferably at least 30 and not larger than 60. If the viscosity is too small, the mechanical strength of a crosslinked rubber product is poor. In contrast, if the viscosity is too large, the extrusion processability is poor.

Rubber Ingredient (A)

The rubber ingredient (A) in the rubber composition of the invention is comprised of ingredient (a), i.e., a nitrile group-containing highly saturated copolymer rubber, and ingredient (b), i.e., an acrylic ester polymer rubber. The ratio of ingredient (a)/ingredient (b) is in the range of 40/60 to 90/10 by weight, preferably 50/50 to 85/15 by weight, and more preferably 60/40 to 80/20 by weight.

If the amount of ingredient (a) (nitrile group-containing highly saturated copolymer rubber) is too small, the mechanical strength of a crosslinked rubber product is poor. In contrast, if the amount of ingredient (a) is too large, the heat resistance of a crosslinked rubber product is not satisfactory.

The rubber composition of the invention may further have incorporated therein rubbers other than the rubber ingredient (A), provided that a crosslinked rubber product made therefrom has the intended heat resistance and other characteristics. As specific examples of the rubbers, there can be mentioned silicone rubber, fluororubber, an ethylene-acrylate copolymer rubber, an ethylene-oxide homopolymer rubber, a propylene-oxide homopolymer rubber, and a copolymer rubber predominantly comprised of ethylene oxide and propylene oxide. Further, a liquid polymer such as an acrylonitrile-butadiene copolymer, polybutadiene or an ethylene-propylene copolymer may be incorporated in the rubber composition. The amount of the rubber optionally used in addition to the rubber ingredient (A) is not larger than 100 parts by weight, preferably not larger than 50 parts by weight, and more preferably not larger than 20 parts by weight, based on 100 parts by weight of the rubber ingredient (A).

As mentioned below, it is not necessary to preliminary mix and knead together ingredient (a) with ingredient (b) to prepare the rubber ingredient (A).

Ethylene-α-Olefin Copolymer

The ethylene-α-olefin copolymer, i.e., ingredient (B), contained in the rubber composition of the invention is a copolymer of ethylene with at least one α-olefin, and is described in, for example, JP-A H6-306121, U.S. Pat. No. 5,194,532, ibid. U.S. Pat. No. 5,272,236 and ibid. U.S. Pat. No. 5,312,938.

The α-olefin is preferably those having 3 to 20 carbon atoms, which include, for example, 1-propene, isobutylene, 1-butene, 1-hexene, 4-methyl-1-pentene and 1-octene. Of these, 1-octene is especially preferable.

In view of the impact resistance and mechanical properties at a low temperature of the ethylene-α-olefin copolymer, and the balance between the heat resistance and cold resistance of a crosslinked rubber product, the copolymerization ratio of ethylene/α-olefin by weight is preferably in the range of 50/50 to 99/1, more preferably 60/40 to 97/3 and most preferably 70/30 to 95/5. Provided that the object and benefit of the invention can be attained, other copolymerizable monomers may be copolymerized with ethylene and an α-olefin.

As specific examples of the copolymerizable monomer, there can be mentioned styrene-type monomers such as styrene, halogenated styrene and alkyl-substituted styrene; dienes such as butadiene and 1,4-hexadienes; and naphthenes such as cyclopentene, cyclohexene and cyclooctene.

The ethylene-α-olefin copolymer usually has a substantially linear structure, and preferably has a narrow molecular weight distribution, as expressed by a small ratio of weight average molecular weight (Mw)/number average molecular weight (Mn), of 1.5 to 2.5. Further, the copolymer usually has a melt index, as measured according to ASTM D-1238, of at least 0.1 and not larger than 30 g/10 min, preferably at least 0.3 and not larger than 20 g/10 min, and more preferably at least 0.5 and not larger than 10 g/10 min.

Preferable ethylene-α-olefin copolymers are commercially available and include, for example, ENGAGE POEs and AFFINITY POPs (both ethylene-1-octene copolymer, supplied by Dow Chem. Co.).

Rubber Composition

The rubber composition of the invention comprises the rubber ingredient (A) and ethylene-α-olefin copolymer ingredient (B) at an ingredient (A)/ingredient (B) ratio by weight of 30/70 to 70/30, preferably 35/65 to 65/35 and more preferably 40/60 to 60/40. If the relative amount of the ethylene-α-olefin copolymer ingredient (B) is too small, the extrusion processability is poor and a stable high rate extrusion is impossible to conduct. In contrast, if the relative amount of the copolymer is too large, a crosslinked rubber product is rigid and has poor rubber elasticity because of shortage of a rubber ingredient.

The rubber composition of the invention comprises an organic peroxide as a crosslinking agent for crosslinking the nitrile group-containing highly saturated copolymer rubber (a). It is to be noted that (i) the acrylic ester polymer rubber (b) does not have a carbon-carbon unsaturated bond except for the carbon-carbon double bonds of a benzene ring, and (ii) the rubber composition of the invention is free from an auxiliary capable of cocrosslinking the rubber ingredient (a) and the rubber ingredient (b) with the organic peroxide, (the auxiliary includes, for example, bismaleimide compounds described in JP-A H2-3438). Therefore, the acrylic ester polymer rubber (b) is incapable of being crosslinked with the organic peroxide.

As specific examples of the organic peroxide incorporated as a crosslinking agent in the rubber composition of the invention, there can be mentioned dicumyl peroxide, di-t-butyl peroxide, t-butylcumyl peroxide, benzoyl peroxide, 2,5-dimethyl-2,5-di(t-butylperoxy)hexyne-3,2,5-dimethyl-2,5-di(benzoylperoxy)hexyne and α,α'-bis(t-butylperoxy-m-isopropyl)benzene.

Other ingredients conventionally used in a rubber industry can be incorporated in the rubber composition of the invention according to the need. Such ingredients include, for example, a reinforcer such as carbon black, silica and talc, a filler such as calcium carbonate and clay, a processing aid, a process oil, an antioxidant, a flame-retardant, an antiozonant, a crosslinking agent, a crosslinking aid and a colorant.

The procedure by which the rubber composition of the invention is prepared is not particularly limited. The rubber composition is usually prepared by mixing and kneading together the nitrile group-containing highly saturated copolymer rubber, the acrylic ester polymer rubber and the ethylene-α-olefin copolymer, and the above-mentioned optional ingredients such as a reinforcer, a filler, a processing aid, a process oil, an antioxidant, a flame-retardant, an antiozonant, a crosslinking agent, a crosslinking aid and a colorant.

In the preparation of the rubber composition, a procedure can be employed wherein ingredient (A) is first prepared from ingredients (a) and (b), and then ingredient (B) is added thereto. Ingredients (a) and (b) and ingredient (B) can also be simultaneously mixed and kneaded together. Or, ingredient (a) and ingredient (B) are first kneaded and then ingredient (b) is incorporated into the kneaded mixture. The optional ingredients may be incorporated at any stage in the course of preparation of the rubber composition. It also is possible to incorporate the optional ingredients in a stage of extruding the rubber composition for shaping.

Electric Wire Covering Material

The electric wire covering material of the invention comprises the above-mentioned rubber composition. The electric wire covering material is extruded into a tube form surrounding an electric wire by using a conventional extruder, and then, the tube-form extrudate is crosslinked by applying high pressure steam or irradiation whereby a protective covering layer is formed around the electric wire.

The crosslinking procedure is not particularly limited, and may be appropriately chosen. When crosslinking is effected by applying high-pressure steam, it is necessary to preliminarily incorporate a crosslinking agent in the rubber composition.

Electric Wire Having Protective Covering Layer

In general, an electric wire covering material in the form of a pellet is prepared by thoroughly mixing and kneading together the rubber composition of the invention and optional ingredients by using a closed type mixer or an open roll and extruding the kneaded mixture into a pellet. Then the covering material is extruded by an extruder at a temperature of 100 to 150° C. into a tube form surrounding a wire and having a thickness of 0.2 to 0.5 mm, and then, the thus-formed tube is crosslinked.

The thus-made electric wire of the invention has a protective covering layer formed from the electric wire covering material. However, a nitrile group-containing highly saturated copolymer rubber has a poor electrically insulating property, and thus, to enhance the electrical insulation of the protective covering layer, an electrically insulating layer is preferably formed on the outer periphery of the electric wire. The electrically insulating layer is formed from an insulating material such as butyl rubber, a styrene-butadiene copolymer rubber, an ethylene-propylene-diene terpolymer rubber (EPDM) or an ethylene-propylene copolymer rubber (EPM).

The invention will now be specifically described by the following examples. The characteristics of rubber compositions and raw material ingredients were evaluated as follows.

(1) Properties of Crosslinked Rubber Product

An uncrosslinked rubber composition was prepared according to the recipe shown in Table 1, and then crosslinked at a temperature of 170° C. for 20 minutes to prepare a sheet having a thickness of 2 mm. According JIS K6251, #3 dumbbell specimens were cut from the sheet, and their tensile strength (unit: MPa), 100% modulus (unit: MPa) and elongation (unit: %) were measured. Hardness was measured according to JIS K6253 by using an A-type durometer.

(2) Heat Aging in Air

A specimen was allowed to stand at 150° C. in air for 168 hours or 508 hours. Then an elongation was measured, and a change in % of the elongation based on the elongation (%) as measured before the high-temperature exposure was determined. The minus value for the elongation change means that the elongation was lowered by the high-temperature exposure.

(3) Gehman Tortion Test

An uncrosslinked rubber composition was prepared according to the recipe shown in Table 1, and then crosslinked at a temperature of 170° C. for 20 minutes to prepare a sheet having a thickness of 2 mm. According JIS K6261, specimens were prepared, and their cold resistance was evaluated. The cold resistance was expressed by an index of T100 (unit: ° C.). The lower the index value, the better the cold resistance.

(4) Extrusion Test

An uncrosslinked rubber composition prepared according to the recipe shown in Table 1 was extruded through a screw-type extruder having a cylinder temperature of 60° C. and a head temperature of 80° C. with a die satisfying the stipulations of ASTM D2230, method A, whereby the extrusion processability was evaluated. The evaluation was conducted on extrusion rate (unit: g/min), extrusion length (unit: cm/min), and shape and appearance of the extrudate, i.e., (1) occurrence of swell and foams, (2) continuity and sharpness of an edge with angle of 30°, (3) surface smoothness and (4) continuity and sharpness of an edge with angle other than 30°, according to the method A. Ratings from 1 to 4 were assigned for the shape and appearance. The larger the total ratings, the better the extrusion processability.

EXAMPLES 1–4

Comparative Examples 1–4

Using a nitrile group-containing highly saturated copolymer rubber, an acrylic ester copolymer rubber, an ethylene-vinyl acetate copolymer and ethylene-1-octene copolymers, and other ingredients shown in Table 1, crosslinkable rubber compositions were prepared by mixing and kneading these polymers and ingredients by using a 1.7 liter Banbury mixer and an open roll. The properties of crosslinked rubber products, elongation change after exposure to high temperature conditions, Gehman tortional temperature, and Garvey die extrusion processability were evaluated, and the results are shown in Table 2.

TABLE 1

|  | Comp. Examples | | | | Examples | | | |
| --- | --- | --- | --- | --- | --- | --- | --- | --- |
|  | 1 | 2 | 3 | 4 | 1 | 2 | 3 | 4 |
| Recipe | | | | | | | | |
| HNBR *1 | 100 | 70 | 42 | 28 | 42 | 42 | 28 | 28 |
| AR1 *2 | — | 30 | 18 | 12 | 18 | 18 | 12 | 12 |
| EVA *3 | — | — | 40 | 60 | — | — | — | — |
| Ethylene-1-octene copolymer (1) *4 | — | — | — | — | 40 | 60 | — | — |
| Ethylene-1-octene copolymer (2) *5 | — | — | — | — | — | — | 40 | 60 |
| Antimony trioxide | 10 | 10 | 10 | 10 | 10 | 10 | 10 | 10 |
| Hydilight H-42 *6 | 60 | 60 | 60 | 60 | 60 | 60 | 60 | 60 |
| Carplex 1120 *7 | 20 | 20 | 20 | 20 | 20 | 20 | 20 | 20 |
| Silane A-172 *8 | 1.5 | 1.5 | 1.5 | 1.5 | 1.5 | 1.5 | 1.5 | 1.5 |
| Diethylene glycol | 2 | 2 | 2 | 2 | 2 | 2 | 2 | 2 |
| Nocrac 224 *9 | 1.5 | 1.5 | 1.5 | 1.5 | 1.5 | 1.5 | 1.5 | 1.5 |
| Nocrac MBZ *10 | 1.5 | 1.5 | 1.5 | 1.5 | 1.5 | 1.5 | 1.5 | 1.5 |
| TMPT *11 | 3 | 3 | 3 | 3 | 3 | 3 | 3 | 3 |
| Percumyl D-40 *12 | 8 | 8 | 8 | 8 | 8 | 8 | 8 | 8 |

Note:
*1 HNBR: Hydrogenated product of acrylonitrile-butadiene copolymer (bound acrylonitrile content: 36 weight %, iodine value: 4, Mooney viscosity: 65)
*2 AR1: Ethyl acrylate (95 weight %)-vinyl chloroacetate (2 weight %) copolymer rubber (Mooney viscosity: 50)
*3 EVA: Ethylene-vinyl acrylate copolymer (vinyl acetate content: 26 weight %)
*4 Ethylene-1-octene copolymer rubber (1) "ENGAGE 8100" (melt index: 1.0 g/10 min, supplied by Dow Chem. Co.)
*5 Ethylene-1-octene copolymer rubber (2) "ENGAGE 8200" (melt index: 5.0 g/10 min. supplied by Dow Chem. Co.)
*6 Hydilight H-42: Aluminum hydroxide (supplied by Showa Denko K.K.)
*7 Carplex 1120: Silica (supplied by Shionogi & Co.)
*8 Silane A-172: Vinyl-tris-β-methoxyethoxysilane (supplied by Nippon Unicar Co.)
*9 Nocrac 224: 2,2,4-trimethyl-1,2-dihydroquinoline (supplied by Oouchi Shinko K.K.)
*10 Nocrac MBZ: 2-mercaptobenzoimidazole zinc salt (supplied by Oouchi Shinko K.K.)
*11 TMPT: Trimethylolpropane trimethacrylate
*12 Percumyl D-40: Dicumyl peroxide (supplied by NOF Corp.)

TABLE 2

|  | Comp. Examples | | | | Examples | | | |
| --- | --- | --- | --- | --- | --- | --- | --- | --- |
|  | 1 | 2 | 3 | 4 | 1 | 2 | 3 | 4 |
| Physical properties of crosslinked product | | | | | | | | |
| Tensile strength (MPa) | 21.2 | 11.2 | 12.2 | 13.1 | 13.0 | 14.6 | 11.3 | 12.6 |
| Elongation (%) | 450 | 610 | 400 | 280 | 470 | 440 | 400 | 360 |

TABLE 2-continued

|  | Comp. Examples | | | | Examples | | | |
| --- | --- | --- | --- | --- | --- | --- | --- | --- |
|  | 1 | 2 | 3 | 4 | 1 | 2 | 3 | 4 |
| 100% Modulus (MPa) | 4.3 | 1.6 | 3.2 | 5.6 | 3.6 | 4.8 | 4.5 | 5.8 |
| Hardness (Duro-A) | 72 | 69 | 74 | 78 | 76 | 80 | 78 | 81 |
| Heat aging in air | | | | | | | | |
| Elongation change (%) | | | | | | | | |
| 168 hours' aging (%) | −26 | −24 | −22 | −18 | −20 | −18 | −22 | −19 |
| 504 hours' aging (%) | −45 | −23 | −24 | −20 | −21 | −20 | −23 | −20 |
| Gehman tortional test | | | | | | | | |
| T100 (° C.) | −46.2 | −29.2 | −28.2 | −27.6 | −46.3 | −47.2 | −45.0 | −46.5 |
| Garvey die extrusion test | | | | | | | | |
| Extrusion rate (g/min) | 32 | 39 | 42 | 44 | 45 | 46 | 42 | 44 |
| Extrusion length (cm/min) | 83 | 76 | 89 | 86 | 85 | 88 | 82 | 85 |
| Evaluation of shape and appearance | | | | | | | | |
| Swell, foam *1 | 2 | 3 | 4 | 4 | 4 | 4 | 4 | 4 |
| Surface smoothness | 1 | 3 | 4 | 4 | 4 | 4 | 4 | 4 |
| Corners *2 | 1 | 3 | 4 | 4 | 4 | 4 | 4 | 4 |
| Edges *4 | 1 | 3 | 4 | 4 | 4 | 4 | 4 | 4 |
| Total ratings | 5 | 12 | 16 | 16 | 16 | 16 | 16 | 16 |

Note:
*1 Occurrence of swell and foams
*2 Continuity and sharpness of an edge with angle other than 30°
*3 Continuity and sharpness of an edge with angle of 30°

As seen from Table 2, a crosslinked nitrile group-containing highly saturated copolymer rubber exhibits good cold resistance, but the change of elongation as measured after heat aging in air is large, and the heat resistance is poor. Further, the extrusion processability is poor, and the shape and appearance of extrudate are not satisfactory (Comparative Example 1).

A crosslinked rubber product of a blend of a nitrile group-containing highly saturated copolymer rubber and an acrylic ester copolymer rubber exhibits good heat aging resistance, but the cold resistance is −29° C., i.e., unsatisfactory (Comparative Example 2). The extrusion characteristics are acceptable, but, an increased extrusion rate is sometimes difficult to adopt, although it is desired for a recently progressing extrusion technique.

A crosslinked rubber product of a blend of a nitrile group-containing highly saturated copolymer rubber, an acrylic ester copolymer rubber and an ethylene-vinyl acetate copolymer exhibits good heat aging resistance and extrusion processability, but the cold resistance is −28° C., i.e., unacceptable and does not satisfy the requirements of the recently progressing technique (Comparative Examples 3 and 4).

In contrast, as seen from Examples 1 to 4, a crosslinked product of the rubber composition of the invention exhibits good heat resistance and, even when it is exposed to a high temperature environment for a long term, it is not hardened nor deteriorated and keeps good rubber characteristics. The shape and appearance of extrudate is evaluated as total rating of 16 and the extrusion processability is satisfactory. Further, the Gehman tortional temperature T100 is lower than −45° C., i.e., the cold resistance is excellent.

INDUSTRIAL APPLICABILITY

The rubber composition of the invention exhibits, when crosslinked, good and balanced heat resistance and cold resistance, and has especially high extrusion processability.

This rubber composition can be used as a covering or coating material for electric wires for an automobile use and an industrial use, and as a raw material for an oil hose used in an automobile industry. The rubber composition is especially useful as a protective covering material for electric wires which are exposed to a high temperature environment for a long term.

The electric wire covering material comprised of this rubber composition has good extrusion processability and exhibits, when crosslinked, excellent heat resistance and cold resistance. Therefore, the electric wire coating or covering material is especially suitable for a covering used for the purpose of bundling, insulating protection, heat-resistant protection or mechanical protection of a group of mutually insulated conductors.

The electric wire having a protective covering made from the electric wire covering material of the invention is characterized in that the protective covering has excellent heat resistance and cold resistance, and therefore, the electric wire withstands a severe change of the surrounding environment, and only a single kind of electric wire can be used in various environments.

What is claimed is:

1. A rubber composition comprising (A) a rubber ingredient comprised of (a) a nitrile group-containing highly saturated copolymer rubber having an iodine value of not larger than 120 and (b) an acrylic ester polymer rubber containing at least 80% by mole of at least one kind of monomer units selected from alkyl acrylates and alkoxyalkyl acrylate, and which is free from a carbon-carbon unsaturated bond except for the carbon-carbon double bonds of a benzene ring, at an (a)/(b) ratio of 40/60 to 90/10 by weight, and (B) an ethylene-1-octene copolymer, the (A)/(B) ratio being in the range of 30/70 to 70/30 by weight; said rubber composition further comprising an organic peroxide and being free from an auxiliary capable of covulcanizing the rubber ingredient (a) and the rubber ingredient (b) with the organic peroxide.

2. A rubber composition according to claim 1, wherein the nitrile group-containing highly saturated copolymer rubber has an iodine value of not larger than 80.

3. A rubber composition according to claim 1, wherein the nitrile group-containing highly saturated copolymer rubber has an iodine value of not larger than 15.

4. A rubber composition according to claim 1, wherein the nitrile group-containing highly saturated copolymer rubber has a Mooney viscosity of 15 to 200.

5. A rubber composition according to claim 1 wherein the nitrile group-containing highly saturated copolymer rubber has a Mooney viscosity of 30 to 100.

6. A rubber composition according to claim 1 wherein the nitrile group-containing highly saturated copolymer rubber contains 10 to 50% by weight of unsaturated nitrile units.

7. A rubber composition according to claim 1, wherein the nitrile group-containing highly saturated copolymer rubber contains 15 to 40% by weight of unsaturated nitrile units.

8. A rubber composition according to claim 1, wherein the alkyl acrylates have an alkyl group with not more than 8 carbon atoms, and the alkoxyalkyl acrylates have an alkoxyalkyl group with not more than 8 carbon atoms.

9. A rubber composition according to claim 8, wherein the acrylic ester polymer rubber is a copolymer rubber containing at least 80% by mole of ethyl acrylate units.

10. A rubber composition according to claim 8, wherein the acrylic ester polymer rubber is a copolymer rubber having copolymerized therein 0.1 to 10% by weight, based on the weight of the rubber, of crosslinking monomer units.

11. A rubber composition according to claim 8, wherein the acrylic ester polymer rubber has a Mooney viscosity of 10 to 90.

12. A rubber composition according to claim 8, wherein the acrylic ester polymer rubber has a Mooney viscosity of 20 to 70.

13. A rubber composition according to claim 1, wherein the (a)/(b) ratio is in the range of 50/50 to 85/15 by weight.

14. A rubber composition according to claim 1, wherein the (a)/(b) ratio is in the range of 60/40 to 80/20 by weight.

15. A rubber composition according to claim 1, wherein the copolymerization ratio of ethylene to 1-octene in the ethylene-1-octene copolymer is in the range of 50/50 to 99/1 by weight.

16. A rubber composition according to claim 1, wherein the copolymerization ratio of ethylene to 1-octene in the ethylene-1-octene copolymer is in the range of 60/40 to 97/3 by weight.

17. A rubber composition according to claim 1, wherein the ethylene-1-octene copolymer has a melt index of 0.1 to 30.

18. A rubber composition according to claim 1, wherein the ethylene-1-octene copolymer has a melt index of 0.3 to 20.

19. A rubber composition according to claim 1, wherein the (A)/(B) ratio is in the range of 35/65 to 65/35 by weight.

20. A rubber composition according to claim 1, wherein the (A)/(B) ratio is in the range of 40/60 to 60/40 by weight.

* * * * *